(12) United States Patent
Reece et al.

(10) Patent No.: US 9,098,258 B2
(45) Date of Patent: Aug. 4, 2015

(54) THERMAL-BASED ACOUSTIC MANAGEMENT

(75) Inventors: Russell Dean Reece, Foster City, CA (US); Jeffrey D. Whitman, Campbell, CA (US); Keith Cox, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 393 days.

(21) Appl. No.: 13/620,405

(22) Filed: Sep. 14, 2012

(65) Prior Publication Data

US 2013/0332760 A1 Dec. 12, 2013

Related U.S. Application Data

(60) Provisional application No. 61/657,645, filed on Jun. 8, 2012.

(51) Int. Cl.

| G06F 1/32 | (2006.01) |
|---|---|
| G06F 1/00 | (2006.01) |
| G06F 1/26 | (2006.01) |
| G06F 9/46 | (2006.01) |
| G06F 1/20 | (2006.01) |
| G06F 9/48 | (2006.01) |

(52) U.S. Cl.
CPC ............... *G06F 1/206* (2013.01); *G06F 1/329* (2013.01); *G06F 1/3296* (2013.01); *G06F 9/485* (2013.01); *G06F 9/4843* (2013.01); *G06F 1/324* (2013.01); *G06F 1/3234* (2013.01); *Y02B 60/1285* (2013.01); *Y02B 60/144* (2013.01)

(58) Field of Classification Search
None
See application file for complete search history.

(56) References Cited

U.S. PATENT DOCUMENTS

| 6,378,076 | B1 | 4/2002 | Qureshi | |
|---|---|---|---|---|
| 7,360,102 | B2 | 4/2008 | Inoue | |
| 7,689,842 | B2 | 3/2010 | Anderson et al. | |
| 8,453,002 | B2 * | 5/2013 | Yoshida | 713/323 |
| 8,751,699 | B1 * | 6/2014 | Tsai et al. | 710/17 |
| 2004/0030942 | A1 * | 2/2004 | Barr et al. | 713/300 |
| 2009/0313492 | A1 | 12/2009 | Lerman | |
| 2010/0223484 | A1 * | 9/2010 | Bold et al. | 713/324 |
| 2011/0213992 | A1 * | 9/2011 | Satsangi et al. | 713/300 |
| 2011/0239025 | A1 * | 9/2011 | Artman et al. | 713/323 |

* cited by examiner

*Primary Examiner* — Ji H Bae
(74) *Attorney, Agent, or Firm* — Blakely, Sokoloff, Taylor & Zafman LLP

(57) ABSTRACT

At least certain embodiments of the disclosures relate to methods, devices, and data processing systems for thermal-based acoustic management. In one embodiment, a computer-implemented method defers one or more background tasks during normal operation of a system if the system has a reduced performance feature that allows reduced or throttled performance in a non-user state. The system enters a low power state (e.g., sleep state) to cool the system after a period of normal operation. The system enters a different low power state (e.g., dark wake state) with a reduced performance and performs at least one of the deferred background tasks while in this low power state without needing a cooling mechanism.

17 Claims, 8 Drawing Sheets

THERMAL-BASED ACOUSTIC MANAGEMENT

RELATED APPLICATIONS

This application claims the benefit of Provisional Application No. 61/657,645, filed Jun. 8, 2012, which is incorporated herein by reference.

FIELD OF THE DISCLOSURE

Embodiments of the present disclosure generally relate to thermal-based acoustic management.

BACKGROUND OF THE DISCLOSURE

Electronic devices, such as computer systems or wireless cellular telephones or other data processing systems, include thermal management for controlling the device and preventing overheating. For example, during normal operation, temperature of the device may increase, which can cause a cooling fan to turn on to cool off the device. However, if the cooling fan is not able to sufficiently cool the device, then a clocking frequency of the central processing unit may need to be slowed in order to decrease the temperature of the device and this also causes slower performance of the system.

SUMMARY OF THE DISCLOSURE

At least certain embodiments of the disclosures relate to methods, devices, and data processing systems for thermal-based acoustic management. In one embodiment, a computer-implemented method defers one or more background tasks during normal operation of a system if the system has a reduced performance feature that allows reduced or throttled performance in a non-user state (e.g., dark wake state). The method causes the system to enter a first low power state (e.g., sleep state) for a first time period to cool the system after a period of normal operation. The method causes the system to enter a second low power state (e.g., dark wake state) for a second time period and performs at least one of the deferred background tasks while in the second low power state. A user of the system is likely not aware that the system enters the second low power state and performs the one or more deferred background tasks because no cooling mechanism (e.g., cooling fan that generates noise while in operation) is needed based on the reduced performance during the second low power state.

In another embodiment, a computer-implemented method defers one or more background tasks during normal operation of a system if the system has a reduced performance feature that allows reduced or throttled performance in a non-user state (e.g., dark wake state). The method causes the system to enter a first low power state (e.g., dark wake state) for a first time period after a period of normal operation when the system does not need to be cooled. The system performs at least one of the deferred background tasks while in the first low power state. The method may cause the system to enter a second low power state (e.g., sleep state) for a second time period when the system needs to be cooled without having to use a cooling mechanism. A user of the system is likely not aware that the system enters the first low power state and performs the one or more deferred background tasks because no cooling mechanism (e.g., cooling fan that generates noise while in operation) is needed based on the reduced performance during the first low power state.

Other systems and methods are also described, and machine readable media, which contain executable instructions to cause a machine to operate as described herein, are also described.

BRIEF DESCRIPTION OF THE DRAWINGS

The present disclosure is illustrated by way of example and not limitation in the figures of the accompanying drawings in which like references indicate similar elements.

DETAILED DESCRIPTION

Methods and data processing systems are disclosed for thermal-based acoustic management. In one embodiment, a computer-implemented method defers one or more background tasks during normal operation of a system if the system has a reduced performance feature that allows reduced or throttled performance in a non-user low power state (e.g., dark wake state, state with no user activity). The method causes the system to enter a low power state (e.g., sleep state) for a first time period to cool the system after a period of normal operation with user activity. The method causes the system to enter a low power state (e.g., dark wake state) with a reduced performance for a second time period and perform at least one of the deferred background tasks. A user of the system is likely not aware that the system enters the non-user low power state and performs the one or more deferred background tasks because no cooling mechanism (e.g., cooling fan that generates noise while in operation) is needed based on the reduced performance. In this manner, the system can perform these tasks during periodic wake ups of the sleeping system without the user knowing that these tasks are occurring. The user will be able to better utilize processing resources during normal operation because the background tasks are deferred until a time when the user is not using the system.

Figure 1A:
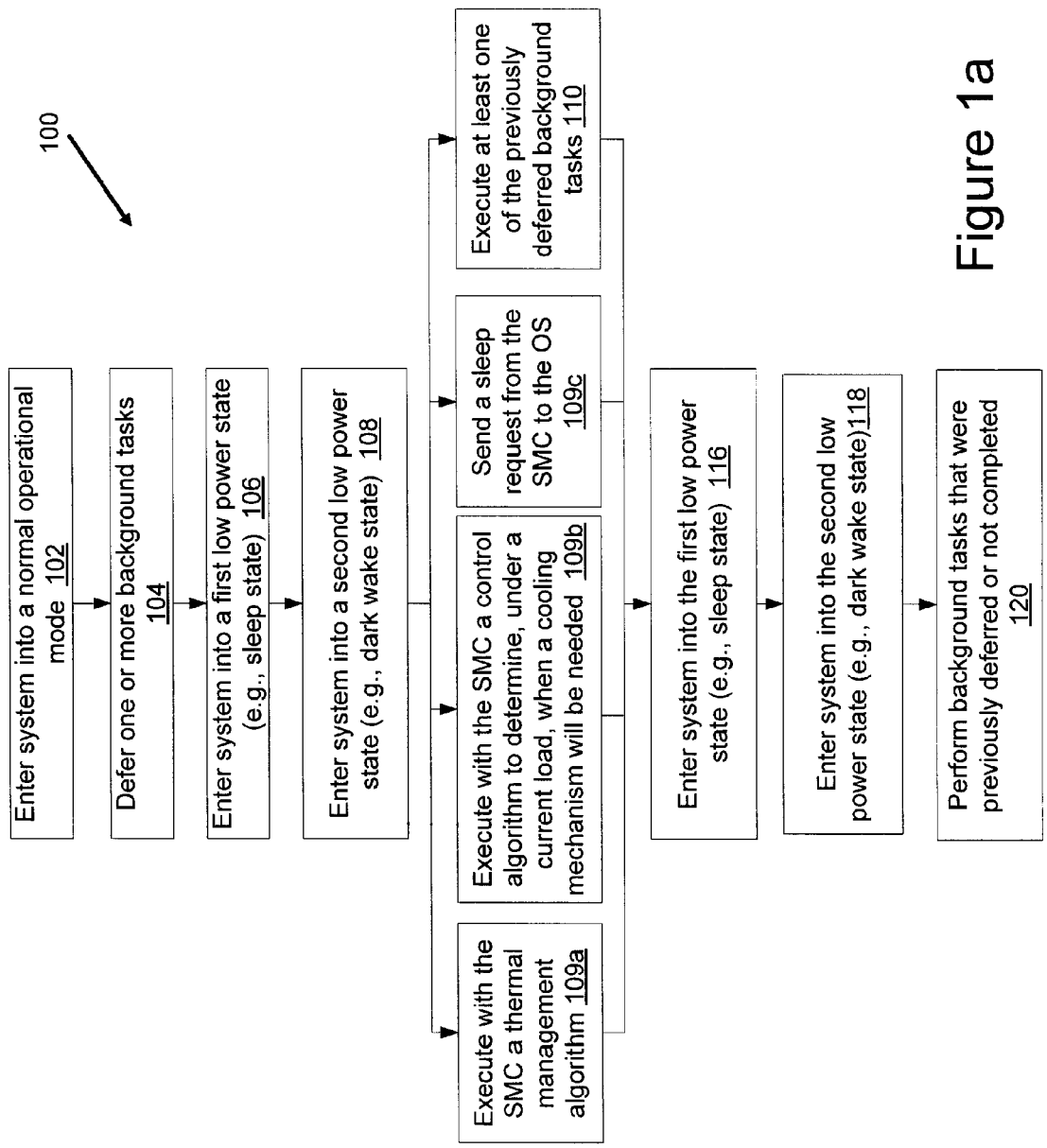
FIG. 1a illustrates a flow diagram in one embodiment of the present invention for a computer-implemented method 100 of thermal-based acoustic management in a data processing system.

FIG. 1a illustrates a flow diagram in one embodiment of the present invention for a computer-implemented method 100 for thermal-based acoustic management in a data processing system. The computer-implemented method 100 is performed by processing logic that may comprise hardware (circuitry, dedicated logic, etc.), software (such as is run on a general purpose computer system or a dedicated machine or a system), or a combination of both. In one embodiment, the computer implemented method 100 is performed by processing logic and a system management controller.

At block 102, processing logic (e.g., one or more processing units) enters a normal operational mode in response to powering ON of the system by a user. At block 104, the processing logic (e.g., one or more processing units) automatically defers one or more background tasks (e.g., installing software tasks, updating indexes of metadata regarding files or items on the system, downloading new email, a backup utility to backup files, etc) with a power assertion until a low power state having reduced performance occurs. The operating system (OS) needs to support the reduced performance feature during a non-user state (e.g., dark wake state with no cooling mechanism) in order to have the background tasks deferred.

At block 106, processing logic may cause the system to enter a first low power state such as a sleep state. For example, a user may close a display screen of a laptop causing the system to enter the sleep state or a lack of input for a certain time period may cause the system to enter the sleep state. The sleep state is a low power state with the one or more processing units being turned off and not executing software code while other heat generators (e.g., memory are also turned off). At block 108, the processing logic enters a second low power state (e.g., dark wake state). At blocks 109a-c, the system management controller (SMC) performs several operations concurrently. At block 109a, the SMC executes a thermal management algorithm, which sets a clocking frequency for the one or more processing units. At block 109b, the SMC executes a control algorithm to determine, under a current load, when a cooling mechanism (e.g., fan) will need to be turned on to cool the system and prevent an overheating condition. At block 109c, the system management controller sends a sleep request to the operating system (OS) prior to the system needing to activate the cooling mechanism based on the determination of the control algorithm. The control algorithm reacts to a change in temperature (e.g., temperature rise) in determining when a cooling mechanism will be needed. The control algorithm limits power to control heat. The dark wake state consumes more power than the sleep state because the one or more processing units are operational, but operate at a lower clocking frequency than during normal operation. Certain heat generators may be turned off during the dark wake state including a graphics processing unit. Some operations may continue during the dark wake state including synchronizing data between devices. At block 110, the processing logic causes the one or more processing units to execute software code (instructions) to perform the one or more background tasks that were previously deferred during normal operation. Blocks 109a-c and 110 may be performed concurrently or substantially at the same time.

At block 116, the processing logic causes the system to enter the first low power state (e.g., sleep state) for a certain time period (e.g., 30 minutes) in response to the sleep request. The control algorithm may determine the certain time period based on a type of platform (e.g., mobile device, laptop, desktop, etc.). At block 118, the processing logic causes the system to enter the second low power state (e.g., dark wake state with disabled cooling mechanism) for a certain time period (e.g., 30 minutes, 1 hour) that is determined by the control algorithm in response to the sleep request. At block 120, the processing logic causes the one or more processing units to execute software code (instructions) to perform background tasks that were previously deferred during normal operation or not completed at block 110. In this manner, the system switches between the first and second low power states as needed to complete the background tasks without needing to trigger the cooling mechanism and potentially make the user aware of the operations of the system. The flow of the method 100 will return to block 102 and the normal operational mode if a user begins using the system at any point in time.

Figure 1B:
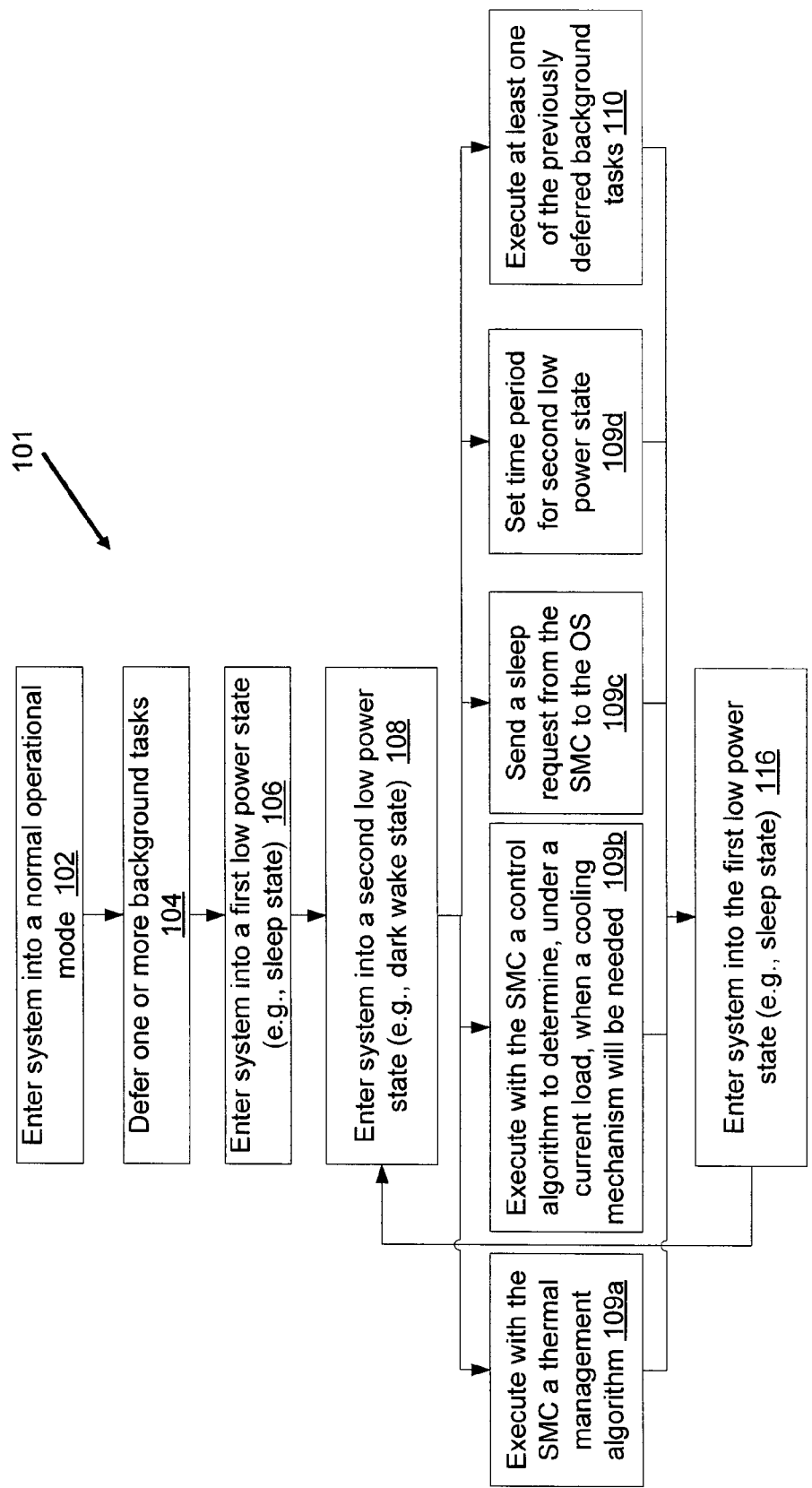
FIG. 1b illustrates a flow diagram in one embodiment of the present invention for a computer-implemented method 101 of thermal-based acoustic management in a data processing system.

FIG. 1b illustrates a flow diagram in one embodiment of the present invention for a computer-implemented method 101 of thermal-based acoustic management in a data processing system. The computer-implemented method 101 is performed by processing logic that may comprise hardware (circuitry, dedicated logic, etc.), software (such as is run on a general purpose computer system or a dedicated machine or a system), or a combination of both. In one embodiment, the computer implemented method 101 is performed by processing logic and a system management controller.

Blocks 102-108, 109a-109c, and 110 of method 101 are performed in the same or similar manner as described for the method 100. The method 101 includes an additional optional block 109d that sets a time period for the second low power state. At blocks 109a-d, the system management controller (SMC) performs several operations concurrently. At block 109a, the SMC executes a thermal management algorithm, which sets a clocking frequency for the one or more processing units. At block 109b, the SMC executes a control algorithm to determine, under a current load, when a cooling mechanism (e.g., fan) will need to be turned on to cool the system and prevent an overheating condition. At block 109c, the system management controller optionally sends a sleep request to the operating system (OS) prior to the system needing to activate the cooling mechanism based on the determination of the control algorithm. The control algorithm reacts to a change in temperature (e.g., temperature rise) in determining when a cooling mechanism will be needed. The control algorithm limits power to control heat. The time period for the second low power state may be set at block 109d and this time period may expire prior to a cooling mechanism being needed. The setting of this time period may preclude the need for a sleep request. At block 110, the processing logic causes the one or more processing units to execute software code (instructions) to perform the one or more background tasks that were previously deferred during normal operation. Blocks 109a-d and 110 may be performed concurrently or substantially at the same time.

At block 116, the processing logic causes the system to enter the first low power state (e.g., sleep state) for a certain time period (e.g., 30 minutes) in response to the sleep request or upon expiration of the time period set for the second low power state. The control algorithm may determine the certain time period of the first low power state based on a type of platform (e.g., mobile device, laptop, desktop, etc.). Upon expiration of the time period of the first low power state, the method 100 returns to block 108 and enters the system into the second low power state. In this manner, the system switches between the first and second low power states as needed to complete the background tasks without needing to trigger the cooling mechanism and potentially make the user aware of the operations of the system. The flow of the method 101 will return to block 102 and the normal operational mode if a user begins using the system at any point in time.

Figure 2:
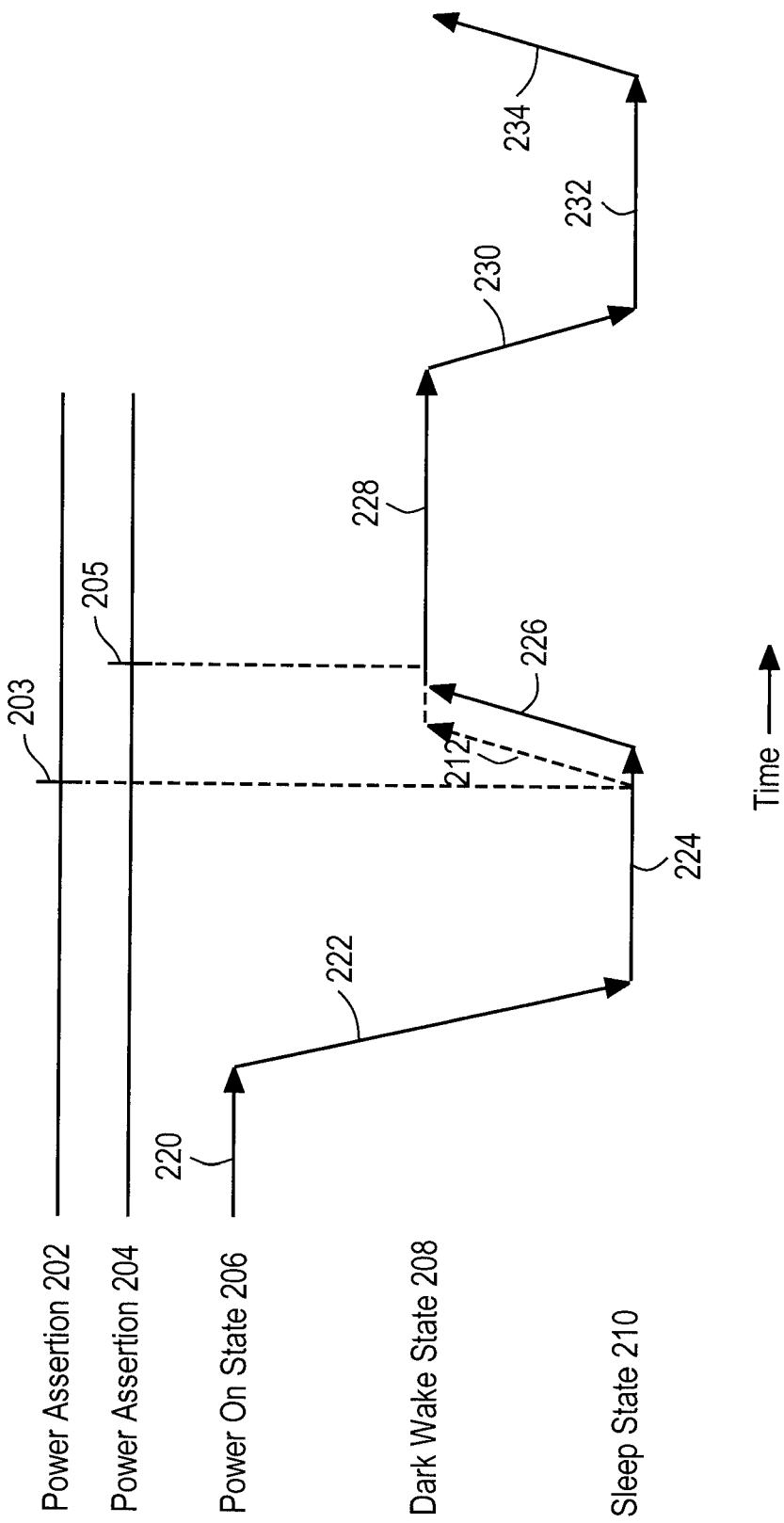
FIG. 2 illustrates a timeline for controlling power states of a system in one embodiment of the present invention.

FIG. 2 illustrates a timeline for controlling power states of a system in one embodiment of the present invention. The system may include a power ON state 206, a dark wake state 208, and a sleep state 210. The power ON state 206 may be used by a user during time period 220 for performing normal operations. Power assertions 202 and 204 represent background tasks that are deferred during normal operation and wait until a user is not using the system and a reduced performance feature of a low power state exists such as dark wake state 208.

At time period 222, the system is not being used by a user in the power ON state and the system transitions to the sleep state 210. At time period 224, the system is allowing the one or more processing units to cool with the processors being turned off. The time period 224 may be predetermined or the OS may control the length of the time period. At time period 226, the system transitions to the dark wake state. Alternatively, the system may transition to the dark wake state 212 based on the execution of power assertion 202 (e.g., backup operation) at point 203. At time period 228, the power assertion 204 is executed beginning at point 205. The OS may determine the time period 228 for performing one or more power assertions before it is necessary to use a cooling mechanism. The system or OS may determine if wired or wireless internet access (e.g., WiFi) is available for performing one or more background tasks. The system may transition back to the sleep state if internet access is not available and needed for completing the background tasks. At time period 230, the system transitions to the sleep state 210 to avoid needing to use the cooling mechanism (e.g., cooling fan). For example, thermal sensors located in the system or near a surface of the system may be monitored by the system or the system management controller to determine when a temperature of one or more processors or a skin temperature near an outer surface of the system approaches or reaches a warning temperature or a cooling mechanism activation temperature. Approaching or reaching the warning temperature (e.g., 35-38 degrees C.) may cause the system to transition from the dark wake state to the sleep state. Approaching or reaching the cooling mechanism activation temperature (e.g., 39-41 degrees C.) may cause the system to activate the cooling mechanism and possibly also transition from the dark wake state to the sleep state. At time period 232, the system is allowing the one or more processing units to cool with the processors being turned off. The OS may determine the time period 232 for cooling the system or it may be predetermined. At time period 234, the system again transitions to the dark wake state.

In one embodiment, the thermal sensors can measure the temperature at a single point in the data processing system or the temperatures at various points in the data processing system. The monitoring of temperature with the thermal sensors may be replaced or supplemented with a thermal status that can be a calculation of a parameter, such as power, that acts as a proxy for the one or more temperatures. In another embodiment, the thermal status can be determined from such a calculation without measuring any temperature. For example, a determination of power consumption (from either measured current or a model of power consumption) can be used as a proxy of temperature without having to use temperature sensors.

Figure 6A:
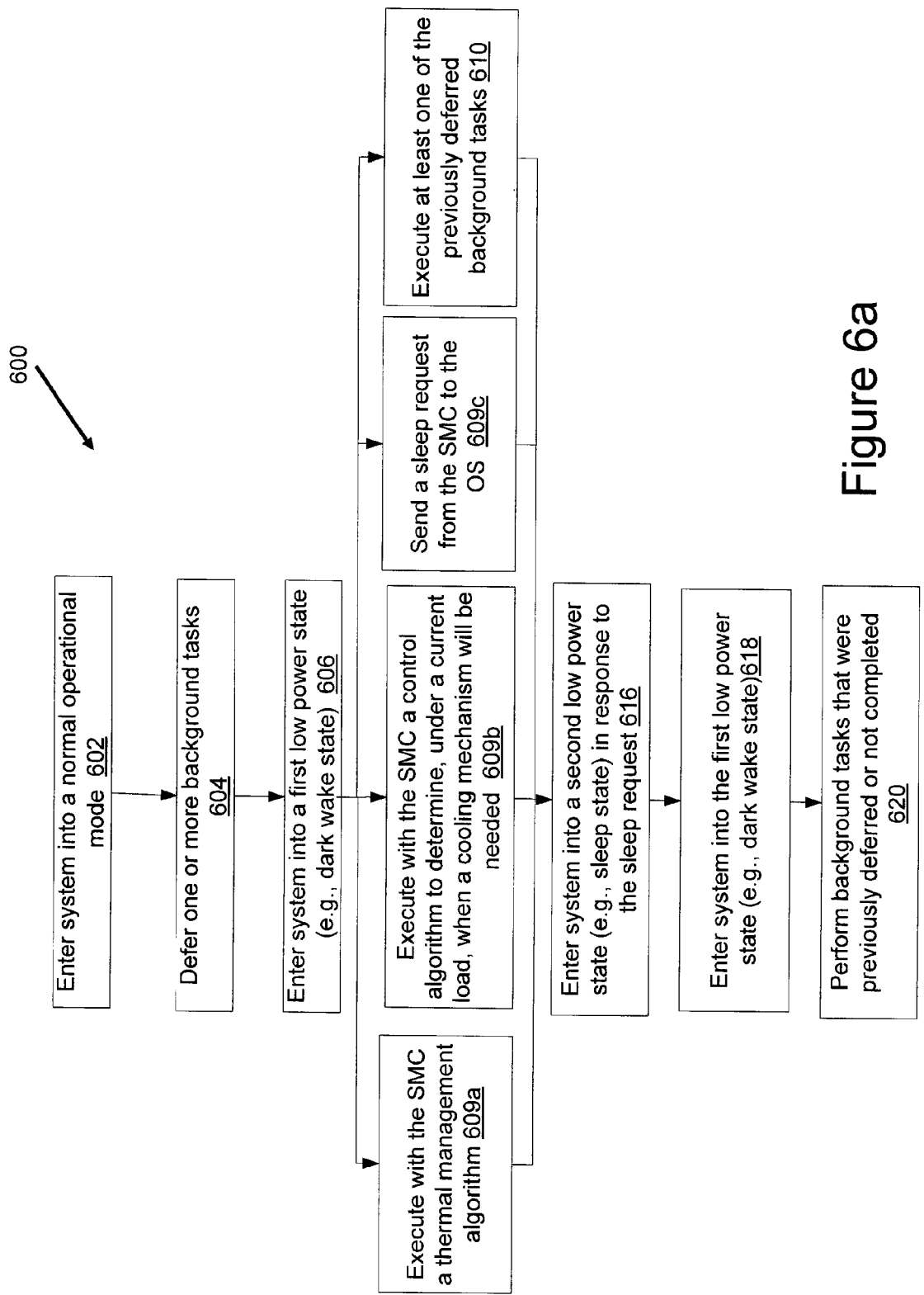
FIG. 6a illustrates a flow diagram in one embodiment of the present invention for a computer-implemented method 600 for thermal-based acoustic management in a data processing system.

FIG. 6a illustrates a flow diagram in another embodiment of the present invention for a computer-implemented method for thermal-based acoustic management in a data processing system. The computer-implemented method 601 is performed by processing logic that may comprise hardware (circuitry, dedicated logic, etc.), software (such as is run on a general purpose computer system or a dedicated machine or a system), or a combination of both. In one embodiment, the computer implemented method 601 is performed by processing logic and a system management controller.

At block 602, processing logic (e.g., one or more processing units) enters a normal operational mode in response to powering ON of the system by a user. At block 604, the processing logic (e.g., one or more processing units) automatically defers one or more background tasks (e.g., installing software tasks, updating indexes of metadata regarding files or items on the system, downloading new email, a backup utility to backup files, etc) with a power assertion until a low power state having reduced performance occurs. The operating system (OS) needs to support the reduced performance feature during a non-user state (e.g., dark wake state with no cooling mechanism) in order to have the background tasks deferred.

At block 606, processing logic may cause the system to enter a first low power state such as a dark wake state. For example, a user may close a display screen of a laptop causing the system to enter the dark wake state or a lack of input for a certain time period may cause the system to enter the dark wake state. At blocks 609a-c, the system management controller (SMC) performs several operations concurrently. At block 609a, the SMC executes a thermal management algorithm, which sets a clocking frequency for the one or more processing units. At block 609b, the SMC executes a control algorithm to determine, under a current load, when a cooling mechanism (e.g., fan) will need to be turned on to cool the system and prevent an overheating condition. At block 609c, the system management controller sends a sleep request to the operating system (OS) prior to the system needing to activate the cooling mechanism based on the determination of the control algorithm. The control algorithm reacts to a change in temperature (e.g., temperature rise) in determining when a cooling mechanism will be needed. The control algorithm limits power to control heat. The dark wake state consumes more power than a sleep state because the one or more processing units are operational in the dark wake state, but operate at a lower clocking frequency than during normal operation. Certain heat generators may be turned off during the dark wake state including a graphics processing unit. Some operations may continue during the dark wake state including synchronizing data between devices. At block 610, the processing logic causes the one or more processing units to execute software code (instructions) to perform the one or more background tasks that were previously deferred during normal operation. Blocks 609a-c and 610 may be performed concurrently or substantially at the same time.

At block 616, the processing logic causes the system to enter a second low power state (e.g., sleep state) for a certain time period (e.g., 30 minutes) in response to the sleep request. The control algorithm may determine the certain time period based on a type of platform (e.g., mobile device, laptop, desktop, etc.). The sleep state is a low power state with the one or more processing units being turned off and not executing software code while other heat generators (e.g., memory are also turned off). At block 618, the processing logic causes the system to enter the first low power state (e.g., dark wake state with disabled cooling mechanism) for a certain time period (e.g., 30 minutes, 1 hour) that is determined by the control algorithm in response to the sleep request. At block 620, the processing logic causes the one or more processing units to execute software code (instructions) to perform background tasks that were previously deferred during normal operation or not completed at block 610. In this manner, the system switches between the first and second low power states as needed to complete the background tasks without needing to trigger the cooling mechanism and potentially make the user aware of the operations of the system. The flow of the method 600 will return to block 602 and the normal operational mode if a user begins using the system at any point in time.

Figure 6B:
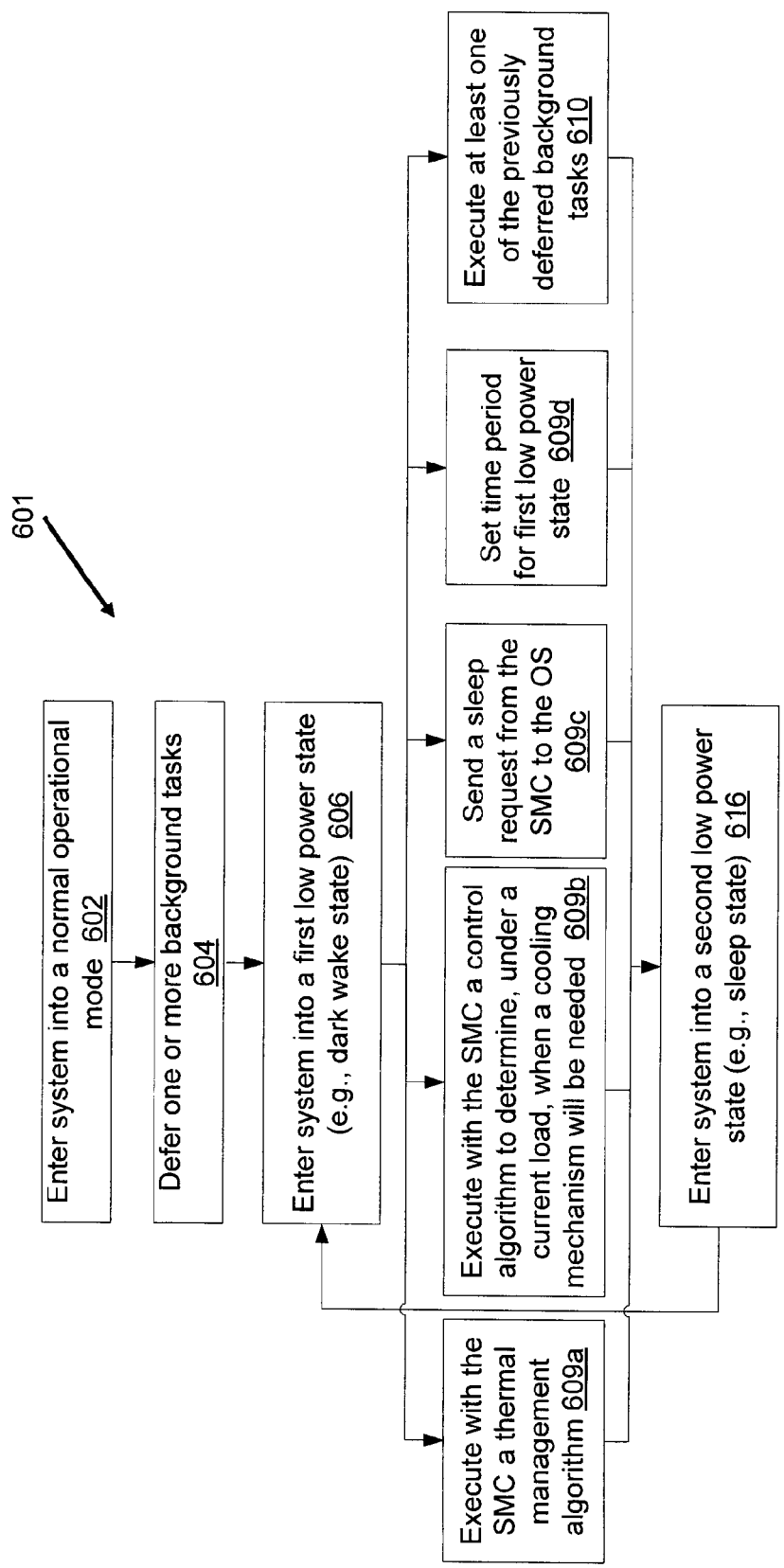
FIG. 6b illustrates a flow diagram in one embodiment of the present invention for a computer-implemented method 601 for thermal-based acoustic management in a data processing system.

FIG. 6b illustrates a flow diagram in one embodiment of the present invention for a computer-implemented method 601 for thermal-based acoustic management in a data processing system. The computer-implemented method 601 is performed by processing logic that may comprise hardware (circuitry, dedicated logic, etc.), software (such as is run on a general purpose computer system or a dedicated machine or a system), or a combination of both. In one embodiment, the computer implemented method 601 is performed by processing logic and a system management controller.

Blocks 602-606, 609a-609c, and 610 of method 601 are performed in the same or similar manner as described for the method 600. The method 601 includes an additional optional block 609d that sets a time period for the first low power state. At blocks 609a-d, the system management controller (SMC) performs several operations concurrently. At block 609a, the SMC executes a thermal management algorithm, which sets a clocking frequency for the one or more processing units. At block 609b, the SMC executes a control algorithm to determine, under a current load, when a cooling mechanism (e.g., fan) will need to be turned on to cool the system and prevent an overheating condition. At block 609c, the system management controller optionally sends a sleep request to the operating system (OS) prior to the system needing to activate the cooling mechanism based on the determination of the control algorithm. The control algorithm reacts to a change in temperature (e.g., temperature rise) in determining when a cooling mechanism will be needed. The control algorithm limits power to control heat. The time period for the first low power state may be set at block 609d and this time period may expire prior to a cooling mechanism being needed. The setting of this time period may preclude the need for a sleep request. At block 610, the processing logic causes the one or more processing units to execute software code (instructions) to perform the one or more background tasks that were previously deferred during normal operation. Blocks 609a-d and 610 may be performed concurrently or substantially at the same time.

At block 616, the processing logic causes the system to enter a second low power state (e.g., sleep state) for a certain time period (e.g., 30 minutes) in response to the sleep request. The control algorithm may determine the certain time period based on a type of platform (e.g., mobile device, laptop, desktop, etc.). The sleep state is a low power state with the one or more processing units being turned off and not executing software code while other heat generators (e.g., memory are also turned off). Upon expiration of the time period of the second low power state, the method 601 returns to block 606 and enters the system into the first low power state. In this manner, the system switches between the first and second low power states as needed to complete the background tasks without needing to trigger the cooling mechanism and potentially make the user aware of the operations of the system. The flow of the method 601 will return to block 602 and the normal operational mode if a user begins using the system at any point in time.

Figure 3:
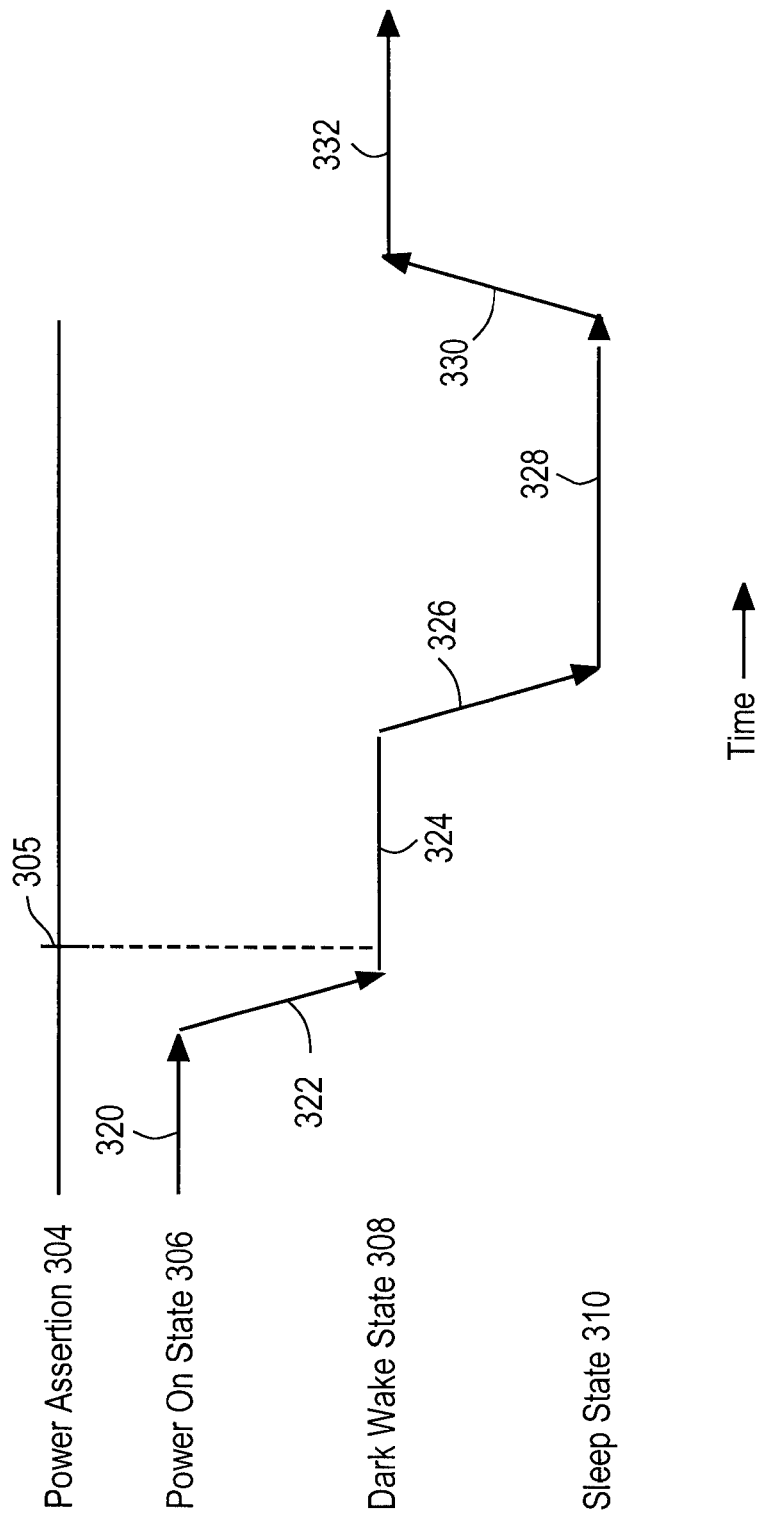
FIG. 3 illustrates a timeline for controlling power states of a system in one embodiment of the present invention.

FIG. 3 illustrates a timeline for controlling power states of a system in another embodiment of the present invention. The system may include a power ON state 306, a dark wake state 308, and a sleep state 310. The power ON state 306 may be used by a user during time period 320 for performing normal operations. Power assertion 304 represents a background task that is deferred during normal operation and waits until a user is not using the system and a low power state exists such as dark wake state.

At time period 322, the system is not being used by a user in the power ON state and the OS determines that the system can safely transition to the dark wake state without needing to use the cooling mechanism. At time period 324, the power assertion 304 is executed beginning at point 305. The OS may determine the time period 324 for performing one or more power assertions before it is necessary to use a cooling mechanism. At time period 326, the system transitions to the sleep state 310 to avoid needing to use the cooling mechanism (e.g., cooling fan). The system management controller determines whether the system will remain in a dark wake state or transition to the sleep state based on monitoring the temperature of the system. At time period 328, the system is allowing the one or more processing units to cool with the processors being turned off. The OS may determine the time period 328 for cooling the system or this time period may be predetermined. At time period 330, the system again transitions to the dark wake state. The OS may determine the time period 332 for performing one or more power assertions before it is necessary to use a cooling mechanism. The system management controller determines whether the system will remain in a dark wake state or transition to the sleep state based on monitoring the temperature of the system.

Figure 4:
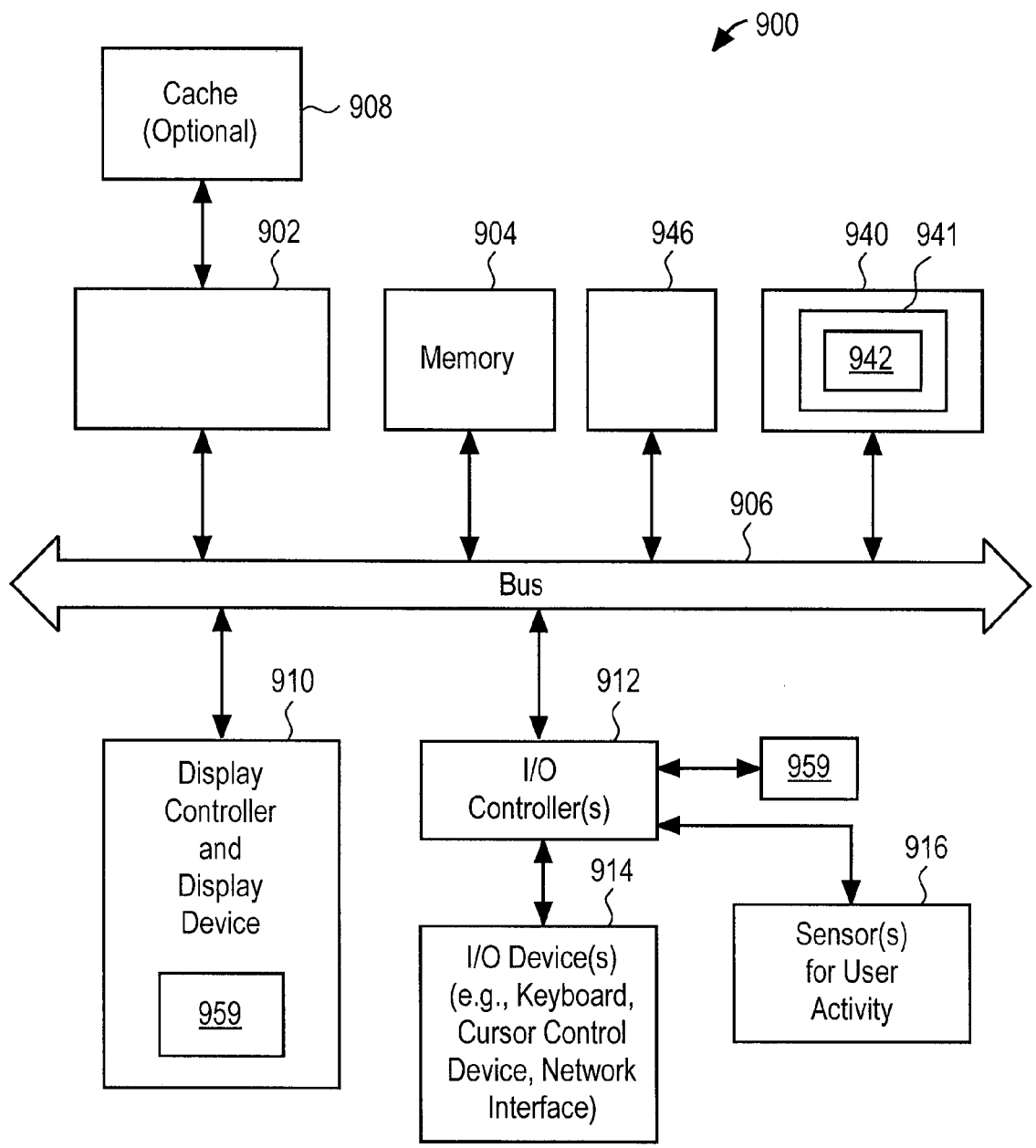
FIG. 4 is a block diagram of one embodiment of the present invention of a data processing system.
Figure 5:
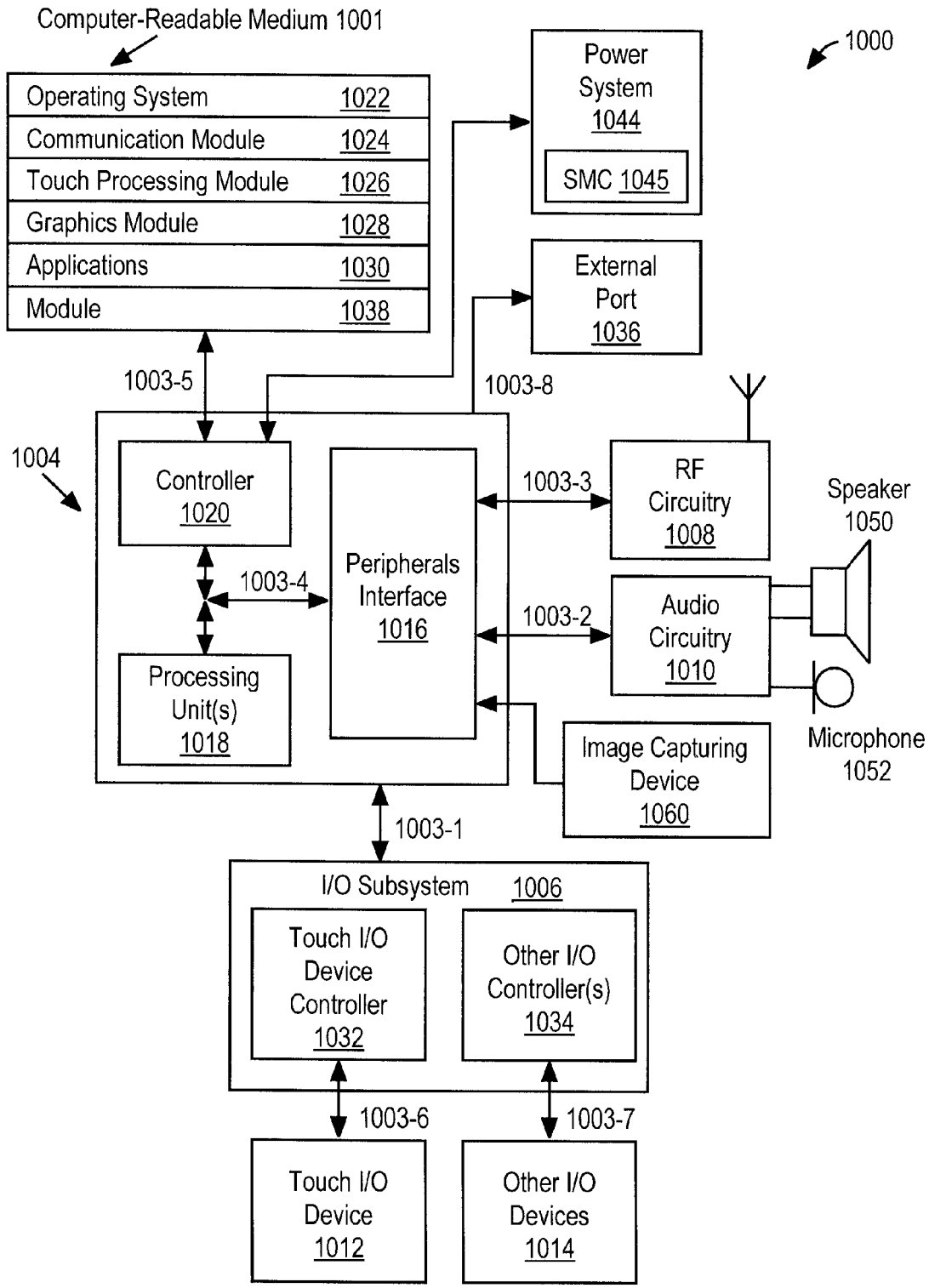
FIG. 5 is a block diagram of one embodiment of the present invention of a system.

In some embodiments, the methods, systems, and apparatuses of the present disclosure can be implemented in various devices including electronic devices, consumer devices, data processing systems, desktop computers, portable computers, wireless devices, cellular devices, tablet devices, handheld devices, multi touch devices, multi touch data processing systems, any combination of these devices, or other like devices. FIGS. 4 and 5 illustrate examples of a few of these devices, which are capable of performing background tasks in a low power state to implement the method of the present disclosure.

FIG. 4 is a block diagram of one embodiment of the present invention of a data processing system that generally includes one or more processing units, a display device, and built-in image capturing device. This data processing system 900 may include one or more processing units 902 and a memory 904, which are coupled to each other through a bus 906. The data processing system 900 may optionally include a cache 908 which is coupled to the one or more processing units 902. The data processing system may optionally include a storage data processing system 940 which may be, for example, any type of solid-state or magnetic memory data processing system. Storage data processing system 940 may be or include a computer-readable medium 941. Computer-readable medium 941 can be any device or medium (e.g., storage device, storage medium, non-transitory medium) that can store code and/or data for use by one or more processing units 902. Medium 941 can include a memory hierarchy, including but not limited to cache, main memory and secondary memory. The memory hierarchy can be implemented using any combination of RAM (e.g., SRAM, DRAM, DDRAM), ROM, FLASH, magnetic and/or optical storage devices, such as disk drives, magnetic tape, CDs (compact disks) and DVDs (digital video discs). Medium 941 may also include a transmission medium for carrying information-bearing signals indicative of computer instructions or data (with or without a carrier wave upon which the signals are modulated). For example, the transmission medium may include a communications network, including but not limited to the Internet (also referred to as the World Wide Web), intranet(s), Local Area Networks (LANs), Wide Local Area Networks (WLANs), Storage Area Networks (SANs), Metropolitan Area Networks (MAN) and the like.

One or more processing units 902 run various software components stored in medium 941 to perform various functions for system 900. In some embodiments, the software components include operating system 942, communication module (or set of instructions), input/output processing module (or set of instructions), graphics module (or set of instructions), one or more applications (or set of instructions), and module [or set of instructions]. These modules (i.e., sets of instructions) need not be implemented as separate software programs, procedures or modules, and thus various subsets of these modules may be combined or otherwise rearranged in various embodiments.

In some embodiments, medium 941 may store a subset of the modules and data structures identified above. Furthermore, medium 941 may store additional modules and data structures not described above.

One or more applications can include any applications installed on system 900, including without limitation, a browser, address book, contact list, email, instant messaging, word processing, keyboard emulation, widgets, JAVA-enabled applications, encryption, digital rights management, voice recognition, voice replication, location determination capability (such as that provided by the global positioning system (GPS), a music player, etc.

System 900 may further include a system management controller 946 (e.g., microcontroller) for performing the method/functions as described herein. In one embodiment, the system management controller 946 may at least function to perform the thermal management algorithm and control algorithm and communicate with the operating system (OS) 942 to perform the functions/methods of the present disclosure as discussed herein. For example, the system management controller 946 may send instructions to the OS 942 to throttle or reduce performance of the system. During a fanless dark wake state, the throttling of the one or more processing units allows the system to perform background tasks while avoiding use of a cooling mechanism such as a cooling fan. The system management controller 946 may send instructions to the OS 942 indicating a wake type (e.g., power ON (user state), fanless dark wake state, dark wake state) from a sleep state.

In one embodiment, the system 900 includes one or more processing units 902 to execute instructions and a system management controller 946 coupled to the one or more processing units. The system management controller provides instructions to reduce a clocking frequency of the one or more processing units during a non-user low power state (e.g., fanless dark wake state) in comparison to a clocking frequency during normal operation of the system. The one or more processing units execute instructions to cause at least one previously deferred background task to be executed while in the non-user low power state. A user of the system is not aware that the system enters the non-user low power state and performs the one or more deferred background tasks because no cooling mechanism (e.g., cooling fan) is needed during the non-user low power state (e.g., fanless dark wake state).

The system management controller executes a control algorithm to determine, under a current load, when a cooling mechanism will need to be turned on to cool the data processing system and prevent an overheating condition. The system management controller sends a sleep request to an operating system (OS) 942 of the data processing system prior to the data processing system needing to activate the cooling mechanism based on the determination of the control algorithm. The system management controller may provide instructions to cause the data processing system to enter another non-user low power state (e.g., sleep state) for a certain time period in response to the sleep request.

This data processing system may also optionally include a display controller and display device 910 which is coupled to the other components through the bus 906. The display device 910 may include an integrated image capturing device 959. One or more input/output controllers 912 are also coupled to the bus 906 to provide an interface for input/output devices 914 and to provide an interface for one or more sensors 916 which are for sensing user activity. The bus 906 may include one or more buses connected to each other through various bridges, controllers, and/or adapters as is well known in the art. The input/output data processing systems 914 may include a keypad or keyboard or a cursor control data processing system such as a touch input panel. Furthermore, the input/output devices 914 may include a network interface which is either for a wired network or a wireless network (e.g. an RF transceiver). The sensors 916 may be any one of the sensors described herein including, for example, a proximity sensor or an ambient light sensor. In certain embodiments of the present disclosure, the data processing system 900 can be used to implement at least some of the methods discussed in the present disclosure.

In one embodiment, a computer readable non-transitory medium stores executable program instructions which when executed cause a data processing system to perform a computer-implemented method such as the methods of FIG. 1a or 1b. The method includes automatically deferring one or more background tasks during normal operation of a system, causing the system to enter a first low power state for a first time period, causing the system to enter a second low power state for a second time period, and performing at least one of the deferred background tasks while in the second low power state. A user of the system may not be aware that the system enters the second low power state and performs the one or more deferred background tasks units.

The method further includes executing a thermal management algorithm to set a clocking frequency for the one or more processing units at a lower level than a clocking frequency during normal operation, executing a control algorithm to determine, under a current load, when a cooling mechanism will need to be turned on to cool the system and prevent an overheating condition, sending a sleep request to an operating system (OS) of the system prior to the system needing to activate the cooling mechanism based on the determination of the control algorithm, causing the system to enter the first low power state for a third time period in response to the sleep request, and causing the system to enter the second low power state for a fourth time period that is determined by the control algorithm in response to the sleep request.

In another embodiment, a computer readable non-transitory medium stores executable program instructions which when executed cause a data processing system to perform a computer-implemented method such as the methods of FIGS. 6a and 6b. The method includes automatically deferring one or more background tasks during normal operation of a system, causing the system to enter a first low power state for a first time period, and performing at least one of the deferred background tasks while in the first low power state. A user of the system may not be not aware that the system enters the first low power state and performs the one or more deferred background tasks units.

The method further includes executing a control algorithm to determine, under a current load, when a cooling mechanism will need to be turned on to cool the system and prevent an overheating condition, sending a sleep request to an operating system (OS) of the system prior to the system needing to activate the cooling mechanism based on the determination of the control algorithm, causing the system to enter a second low power state for a second time period in response to the sleep request, and causing the system to enter the first low power state for a third time period that is determined by the control algorithm.

FIG. 5 is a block diagram of one embodiment of the present invention of system 1000 that generally includes one or more computer-readable mediums 1001, processing system 1004, Input/Output (I/O) subsystem 1006, radio frequency (RF) circuitry 1008, and audio circuitry 1010. These components may be coupled by one or more communication buses or signal lines 1003.

It should be apparent that the architecture shown in FIG. 5 is only one example architecture of system 1000, and that system 1000 could have more or fewer components than shown, or a different configuration of components. The various components shown in FIG. 5 can be implemented in hardware, software, firmware or any combination thereof, including one or more signal processing and/or application specific integrated circuits.

RF circuitry 1008 is used to send and receive information over a wireless link or network to one or more other devices and includes well-known circuitry for performing this function. RF circuitry 1008 and audio circuitry 1010 are coupled to processing system 1004 via peripherals interface 1016. Interface 1016 includes various known components for establishing and maintaining communication between peripherals and processing system 1004. Audio circuitry 1010 is coupled to audio speaker 1050 and microphone 1052 and includes known circuitry for processing voice signals received from interface 1016 to enable a user to communicate in real-time with other users. In some embodiments, audio circuitry 1010 includes a headphone jack (not shown).

Peripherals interface 1016 couples the input and output peripherals of the system to one or more processing units 1018 and computer-readable medium 1001. One or more processing units 1018 communicate with one or more computer-readable mediums 1001 via controller 1020. Computer-readable medium 1001 can be any device or medium (e.g., storage device, storage medium) that can store code and/or data for use by one or more processing units 1018. Medium 1001 can include a memory hierarchy, including but not limited to cache, main memory and secondary memory. The memory hierarchy can be implemented using any combination of RAM (e.g., SRAM, DRAM, DDRAM), ROM, FLASH, magnetic and/or optical storage devices, such as disk drives, magnetic tape, CDs (compact disks) and DVDs (digital video discs). Medium 1001 may also include a transmission medium for carrying information-bearing signals indicative of computer instructions or data (with or without a carrier wave upon which the signals are modulated). For example, the transmission medium may include a communications network, including but not limited to the Internet (also referred to as the World Wide Web), intranet(s), Local Area Networks (LANs), Wide Local Area Networks (WLANs), Storage Area Networks (SANs), Metropolitan Area Networks (MAN) and the like.

One or more processing units 1018 run various software components stored in medium 1001 to perform various functions for system 1000. In some embodiments, the software components include operating system 1022, communication module (or set of instructions) 1024, touch processing module (or set of instructions) 1026, graphics module (or set of instructions) 1028, one or more applications (or set of instructions) 1030, and module [or set of instructions] 1038. The module 1038 corresponds to a set of instructions for performing one or more functions described above and the methods described in this application (e.g., the computer-implemented methods and other information processing methods described herein). These modules (i.e., sets of instructions) need not be implemented as separate software programs, procedures or modules, and thus various subsets of these modules may be combined or otherwise rearranged in various embodiments.

In some embodiments, medium 1001 may store a subset of the modules and data structures identified above. Furthermore, medium 1001 may store additional modules and data structures not described above.

Operating system 1022 includes various procedures, sets of instructions, software components and/or drivers for controlling and managing general system tasks (e.g., memory management, storage device control, power management, etc.) and facilitates communication between various hardware and software components.

Communication module 1024 facilitates communication with other devices over one or more external ports 1036 or via RF circuitry 1008 and includes various software components for handling data received from RF circuitry 1008 and/or external port 1036.

Graphics module 1028 includes various known software components for rendering, animating and displaying graphical objects on a display surface. In embodiments in which touch I/O device 1012 is a touch sensitive display (e.g., touch screen), graphics module 1028 includes components for rendering, displaying, and animating objects on the touch sensitive display.

One or more applications 1030 can include any applications installed on system 1000, including without limitation, a browser, address book, contact list, email, instant messaging, word processing, keyboard emulation, widgets, JAVA-enabled applications, encryption, digital rights management, voice recognition, voice replication, location determination capability (such as that provided by the global positioning system (GPS), a music player, etc.

Touch processing module 1026 includes various software components for performing various tasks associated with touch I/O device 1012 including but not limited to receiving and processing touch input received from I/O device 1012 via touch I/O device controller 1032.

I/O subsystem 1006 is coupled to touch I/O device 1012 and one or more other I/O devices 1014 for controlling or performing various functions. Touch I/O device 1012 communicates with processing system 1004 via touch I/O device controller 1032, which includes various components for processing user touch input (e.g., scanning hardware). One or more other input controllers 1034 receives/sends electrical signals from/to other I/O devices 1014. Other I/O devices 1014 may include physical buttons, dials, slider switches, sticks, keyboards, touch pads, additional display screens, or any combination thereof.

If embodied as a touch screen, touch I/O device 1012 displays visual output to the user in a GUI. The visual output may include text, graphics, video, and any combination thereof. Some or all of the visual output may correspond to user-interface objects. Touch I/O device 1012 forms a touch-sensitive surface that accepts touch input from the user. Touch I/O device 1012 and touch screen controller 1032 (along with any associated modules and/or sets of instructions in medium 1001) detects and tracks touches or near touches (and any movement or release of the touch) on touch I/O device 1012 and converts the detected touch input into interaction with graphical objects, such as one or more user-interface objects. In the case in which device 1012 is embodied as a touch screen, the user can directly interact with graphical objects that are displayed on the touch screen. Alternatively, in the case in which device 1012 is embodied as a touch device other than a touch screen (e.g., a touch pad), the user may indirectly interact with graphical objects that are displayed on a separate display screen embodied as I/O device 1014.

Embodiments in which touch I/O device 1012 is a touch screen, the touch screen may use LCD (liquid crystal display) technology, LPD (light emitting polymer display) technology, OLED (organic LED), or OEL (organic electro luminescence), although other display technologies may be used in other embodiments.

Feedback may be provided by touch I/O device 1012 based on the user's touch input as well as a state or states of what is being displayed and/or of the computing system. Feedback may be transmitted optically (e.g., light signal or displayed image), mechanically (e.g., haptic feedback, touch feedback, force feedback, or the like), electrically (e.g., electrical stimulation), olfactory, acoustically (e.g., beep or the like), or the like or any combination thereof and in a variable or non-variable manner.

System 1000 also includes power system 1044 for powering the various hardware components and may include a power management system, one or more power sources, a recharging system, a power failure detection circuit, a power converter or inverter, a power status indicator and any other components typically associated with the generation, management and distribution of power in portable devices including a system management controller 1045 that communicates with the operating system 1022 to provide the functions/methods of the present disclosure.

In some embodiments, peripherals interface 1016, one or more processing units 1018, and memory controller 1020 may be implemented on a single chip, such as processing system 1004. In some other embodiments, they may be implemented on separate chips.

The present disclosure can relate to an apparatus for performing one or more of the operations described herein. This apparatus may be specially constructed for the required purposes, or it may comprise a general purpose computer selectively activated or reconfigured by a computer program stored in the computer. Such a computer program may be stored in a machine (e.g. computer) readable storage medium, such as, but is not limited to, any type of disk including floppy disks, optical disks, CD-ROMs, and magnetic-optical disks, read-only memories (ROMs), random access memories (RAMs), erasable programmable ROMs (EPROMs), electrically erasable programmable ROMs (EEPROMs), flash memory, magnetic or optical cards, or any type of media suitable for storing electronic instructions, and each coupled to a bus.

A machine-readable medium includes any mechanism for storing or transmitting information in a form readable by a machine (e.g., a computer). For example, machines store and communicate (internally and with other devices over a network) code and data using machine-readable media, such as machine storage media (e.g., magnetic disks; optical disks; random access memory; read only memory; flash memory devices; phase-change memory).

In the foregoing specification, the disclosure has been described with reference to specific exemplary embodiments thereof. It will be evident that various modifications may be made thereto without departing from the broader spirit and scope of the disclosure as set forth in the following claims. The specification and drawings are, accordingly, to be regarded in an illustrative sense rather than a restrictive sense.

What is claimed is:

1. A computer-implemented method, comprising:
   automatically deferring one or more background tasks during normal operation of a system;
   causing the system to enter a first low power state for a first time period;
   causing the system to enter a second low power state for a second time period;
   sending a sleep request to an operating system (OS) of the system prior to the system needing to activate a cooling mechanism as determined by a control algorithm;
   causing the system to enter the first low power state for a third time period in response to the sleep request;
   causing the system to enter the second low power state for a fourth time period that is determined by the control algorithm in response to the sleep request; and
   performing at least one of the deferred background tasks while in the second low power state.

2. The computer-implemented method of claim 1, wherein noise from the cooling mechanism is reduced when the system enters the second low power state and performs the one or more deferred background tasks.

3. The computer-implemented method of claim 1, further comprising:
   executing a thermal management algorithm to set a clocking frequency for one or more processing units in the system at a lower level than a clocking frequency during normal operation.

4. The computer-implemented method of claim 1, further comprising:
   executing the control algorithm to determine, under a current load, when the cooling mechanism will need to be turned on to cool the system and prevent an overheating condition.

5. A computer readable non-transitory medium storing executable program instructions which when executed cause a data processing system to perform a computer-implemented method, comprising:
   automatically deferring one or more background tasks during normal operation of a system;
   causing the system to enter a first low power state for a first time period;
   causing the system to enter a second low power state for a second time period;
   sending a sleep request to an operating system (OS) of the system prior to the system needing to activate a cooling mechanism based on a determination of a control algorithm;
   causing the system to enter the first low power state for a third time period in response to the sleep request; and
   causing the system to enter the second low power state for a fourth time period that is determined by the control algorithm in response to the sleep request; and
   performing at least one of the deferred background tasks while in the second low power state.

6. The computer readable non-transitory medium of claim 5, wherein noise from the cooling mechanism is reduced during the second low power state and performs the one or more deferred background tasks.

7. The computer readable non-transitory medium of claim 5, further comprising:
   executing a thermal management algorithm to set a clocking frequency for one or more processing units in the system at a lower level than a clocking frequency during normal operation.

8. The computer readable non-transitory medium of claim 5, further comprising:
   executing the control algorithm to determine, under a current load, when the cooling mechanism will need to be turned on to cool the system and prevent an overheating condition.

9. A data processing system, comprising:
one or more processing units to execute instructions; and
a system management controller coupled to the one or more processing units, the system management controller programmed to provide instructions to reduce a clocking frequency of the one or more processing units during a first low power state in comparison to a clocking frequency during normal operation of the data processing system, to send a sleep request to an operating system (OS) of the data processing system prior to the data processing system needing to activate a cooling mechanism based on the determination of a control algorithm, and to cause the data processing system to enter a second low power state for a first time period in response to the sleep request, the one or more processing units programmed to execute instructions to cause at least one background task to be executed while in the first low power state.

10. The data processing system of claim 9, wherein noise from the cooling mechanism is reduced when the system enters the first low power state and performs the one or more deferred background tasks.

11. The data processing system of claim 9, wherein the system management controller is further programmed to execute the control algorithm to determine, under a current load, when the cooling mechanism will need to be turned on to cool the data processing system and prevent an overheating condition.

12. A computer-implemented method, comprising:
automatically deferring one or more background tasks during normal operation of a system;
causing the system to enter a first low power state for a first time period;
sending a sleep request to an operating system (OS) of the system prior to the system needing to activate a cooling mechanism based on a determination of a control algorithm;
causing the system to enter a second low power state for a second time period in response to the sleep request; and
causing the system to enter the first low power state for a third time period that is determined by the control algorithm; and
performing at least one of the deferred background tasks while in the first low power state.

13. The computer-implemented method of claim 12, wherein noise from the cooling mechanism is reduced when the system enters the first low power state and performs the one or more deferred background tasks.

14. The computer-implemented method of claim 12, further comprising:
executing the control algorithm to determine, under a current load, when the cooling mechanism will need to be turned on to cool the system and prevent an overheating condition.

15. A computer readable non-transitory medium storing executable program instructions which when executed cause a data processing system to perform a computer-implemented method, comprising:
automatically deferring one or more background tasks during normal operation of a system;
causing the system to enter a first low power state for a first time period;
sending a sleep request to an operating system (OS) of the system prior to the system needing to activate a cooling mechanism based on the determination of a control algorithm;
causing the system to enter a second low power state for a second time period in response to the sleep request; and
causing the system to enter the first low power state for a third time period that is determined by the control algorithm; and
performing at least one of the deferred background tasks while in the first low power state.

16. The computer readable non-transitory medium of claim 15, wherein noise from the cooling mechanism is reduced when the system enters the first low power state and performs the one or more deferred background tasks.

17. The computer readable non-transitory medium of claim 15, the method further comprising:
executing the control algorithm to determine, under a current load, when the cooling mechanism will need to be turned on to cool the system and prevent an overheating condition.

* * * * *